United States Patent
Chathoth et al.

(10) Patent No.: US 10,250,594 B2
(45) Date of Patent: Apr. 2, 2019

(54) DECLARATIVE TECHNIQUES FOR TRANSACTION-SPECIFIC AUTHENTICATION

(71) Applicant: Oracle International Corporation, Redwood Shores, CA (US)

(72) Inventors: Vikas Pooven Chathoth, Bangalore (IN); Ramya Subramanya, Bangalore (IN); Ranjan Khanna, Edina, MN (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/671,935

(22) Filed: Mar. 27, 2015

(65) Prior Publication Data

US 2016/0285871 A1    Sep. 29, 2016

(51) Int. Cl.
*H04L 29/06* (2006.01)
(52) U.S. Cl.
CPC ...... *H04L 63/0838* (2013.01); *H04L 63/0807* (2013.01)
(58) Field of Classification Search
CPC ............. H04L 63/0838; H04L 63/0263; H04L 9/3228
See application file for complete search history.

(56) References Cited

U.S. PATENT DOCUMENTS 6,246,769 B1   6/2001   Kohut
6,412,077 B1   6/2002   Roden et al.

(Continued)

FOREIGN PATENT DOCUMENTS

CN    104660412 A    5/2015
EP    2743857        6/2014

(Continued)

OTHER PUBLICATIONS

DirX Access V8.3 Web Access Management and Identity Federation. Technical Data Sheet [online]. Dec. 2013. Copyright 2013 Atos [retrieved on Sep. 4, 2014]. Retrieved from the Internet: <URL: http://atos.net/content/dam/global/documents/we-do/atos-dirx-access-v83-datasheet.pdf>, 14 pages.

(Continued)

*Primary Examiner* — Samson B Lemma
*Assistant Examiner* — Arya Golriz
(74) *Attorney, Agent, or Firm* — Kilpatrick Townsend & Stockton LLP

(57) ABSTRACT

Techniques are disclosed for providing and/or implementing utilizing declarative techniques for transaction-specific authentication. Certain techniques are disclosed herein that enable transaction signing using modular authentication via declarative requests from applications. An application can declaratively specify one or more transaction factor values to be used in an authentication, and the authentication, using a transaction-signed one-time password, can be directed by an access manager module without further involvement of the application. Upon a successful or non-successful authentication, the access manager module can provide the result back to the application. Accordingly, an authentication process specific to (and valid only for) a particular transaction can be performed without direct involvement of the application and without application-centric knowledge required by the access manager module.

22 Claims, 10 Drawing Sheets

(56) References Cited

U.S. PATENT DOCUMENTS

| | | | |
|---|---|---|---|
| 6,892,307 | B1 | 5/2005 | Wood et al. |
| 6,950,949 | B1 | 9/2005 | Gilchrist |
| 7,086,085 | B1 | 8/2006 | Brown et al. |
| 7,523,309 | B1 | 4/2009 | Talbot et al. |
| 7,562,222 | B2 | 7/2009 | Gasparini et al. |
| 7,904,946 | B1 | 3/2011 | Chu et al. |
| 8,010,996 | B2 | 8/2011 | Cline et al. |
| 8,122,251 | B2 | 2/2012 | Santos et al. |
| 8,141,140 | B2 | 3/2012 | Wenzel et al. |
| 8,281,379 | B2 | 10/2012 | Noe |
| 8,302,167 | B2 | 10/2012 | Mennes et al. |
| 8,312,519 | B1* | 11/2012 | Bailey ............... H04L 9/003 380/255 |
| 8,327,422 | B1 | 12/2012 | Friedman et al. |
| 8,453,224 | B2 | 5/2013 | Mutt |
| 8,555,355 | B2 | 10/2013 | Rathbun |
| 8,578,476 | B2 | 11/2013 | Sama |
| 8,625,796 | B1 | 1/2014 | Ayed |
| 8,627,438 | B1 | 1/2014 | Bhimanaik |
| 8,763,097 | B2 | 6/2014 | Bhatnagar et al. |
| 8,843,997 | B1 | 9/2014 | Hare |
| 8,856,892 | B2 | 10/2014 | Faludi |
| 8,898,765 | B2 | 11/2014 | Goyal et al. |
| 9,864,944 | B2 | 1/2018 | Radu et al. |
| 2003/0070091 | A1 | 4/2003 | Loveland |
| 2004/0128561 | A1* | 7/2004 | Bouchat ............ H04L 63/0823 726/5 |
| 2004/0167984 | A1 | 8/2004 | Herrmann |
| 2004/0215750 | A1 | 10/2004 | Stilp |
| 2005/0015594 | A1 | 1/2005 | Ashley et al. |
| 2005/0156947 | A1* | 7/2005 | Sakai ................. G06F 17/214 345/629 |
| 2006/0056415 | A1* | 3/2006 | Lee ..................... H04L 12/14 370/392 |
| 2006/0145842 | A1 | 7/2006 | Stilp |
| 2006/0274920 | A1 | 12/2006 | Tochikubo et al. |
| 2007/0136573 | A1 | 6/2007 | Steinberg |
| 2007/0199053 | A1 | 8/2007 | Sandhu et al. |
| 2007/0200597 | A1 | 8/2007 | Oakland |
| 2008/0148351 | A1 | 6/2008 | Bhatia et al. |
| 2009/0037763 | A1 | 2/2009 | Adhya et al. |
| 2009/0288148 | A1* | 11/2009 | Headley ............. H04L 9/3271 726/5 |
| 2009/0292927 | A1 | 11/2009 | Wenzel et al. |
| 2010/0146263 | A1 | 6/2010 | Das et al. |
| 2011/0320616 | A1 | 12/2011 | Wray |
| 2011/0320820 | A1 | 12/2011 | Wray |
| 2012/0066749 | A1 | 3/2012 | Taugbol et al. |
| 2012/0203906 | A1 | 8/2012 | Jaudon et al. |
| 2012/0314862 | A1 | 12/2012 | Min |
| 2013/0111208 | A1 | 5/2013 | Sabin et al. |
| 2013/0159732 | A1 | 6/2013 | Leoutsarakos |
| 2013/0185209 | A1 | 7/2013 | Ahn |
| 2013/0198613 | A1* | 8/2013 | Scoda ................ G06F 17/227 715/239 |
| 2013/0205373 | A1 | 8/2013 | Jaudon et al. |
| 2013/0219479 | A1 | 8/2013 | DeSoto et al. |
| 2013/0290719 | A1 | 10/2013 | Kaler et al. |
| 2014/0082706 | A1 | 3/2014 | Banford |
| 2014/0096190 | A1 | 4/2014 | Subramanya et al. |
| 2014/0208386 | A1 | 7/2014 | Sama |
| 2014/0214688 | A1 | 7/2014 | Weiner et al. |
| 2014/0250490 | A1* | 9/2014 | Baca .................. H04L 9/3228 726/1 |
| 2014/0279445 | A1* | 9/2014 | Jiang ................ G06Q 20/3276 705/39 |
| 2015/0121503 | A1 | 4/2015 | Xiong |
| 2015/0150110 | A1 | 5/2015 | Canning et al. |
| 2015/0222615 | A1 | 8/2015 | Allain et al. |
| 2015/0249540 | A1 | 9/2015 | Khalil et al. |
| 2015/0304847 | A1 | 10/2015 | Gong et al. |
| 2016/0063226 | A1 | 3/2016 | Singh et al. |
| 2016/0065554 | A1 | 3/2016 | Brown et al. |
| 2016/0379431 | A1 | 12/2016 | Borg et al. |
| 2017/0034152 | A1 | 2/2017 | Subramanya et al. |
| 2017/0118025 | A1 | 4/2017 | Shastri et al. |
| 2017/0118202 | A1 | 4/2017 | Mathew et al. |
| 2017/0118223 | A1 | 4/2017 | Mathew et al. |
| 2017/0126733 | A1 | 5/2017 | Mathew et al. |

FOREIGN PATENT DOCUMENTS

| | | |
|---|---|---|
| WO | 2012156785 A1 | 11/2012 |
| WO | 2014/041336 A1 | 3/2014 |
| WO | WO2017070412 | 4/2017 |

OTHER PUBLICATIONS eToken 3500—OTP Banking Token. safenet-inc.com [online]. Copyright 2006-2015 Gemalto NV [site visited Sep. 4, 2014]. Retrieved from the Internet: <URL: http:// www.safenet-inc.com/multi-factor-authentication/authenticators/one-time-password-otp/etoken-3500-banking-token/#content-left>, 2 pages.

HSBC Internet Banking Terms and Conditions. hsbc.co.in [online]. Copyright 2015, The Hongkong and Shanghai Banking Corporation Limited, India (HSBC India) [site visited Sep. 4, 2014]. Retrieved from the Internet: <URL: http://www.hsbc.co.in/1/2/ALL_SITE_PAGES/HUB_PIB/PIB_TERMS_AND_CONDITIONS#pib5>, 30 pages.

JPMorgan Access$^{SM}$ Security Features. Datasheet [online]. Copyright 2008 JPMorgan Chase & Co., Jun. 2008. Retrieved from the Internet: <URL: https://www.jpmorgan.com/cm/BlobServer?blobcol=urldata&blobtable=MungoBlobs&blobkey=id&blobwhere=1158520944481&blobheader=application%2Fpdf&blobnocache=true&blobheadername1=Content-disposition&blobheadervalue1=attachment;filename=FirstCash-C_JPMA_Sec_Features.pdf>, 2 pages.

New Security Token FAQs. maybank2u.com.sg [online]. Copyright 2015 Maybank, Malayan Banking Berhad, Sep. 4, 2014 [site visited Sep. 4, 2014]. Retrieved from the Internet: <URL: http://info.maybank2u.com.sg/eservices/personal/faq/faq-security-token.aspx>, 10 pages.

OTP c600 Secure Transaction Signing + OTP Mobile Token. Datasheet. rockey.com.my [online]. Softkey E-Solution SDN BHD [site visited Sep. 5, 2014]. Retrieved from the Internet: <URL: http://www.rockey.com.my/wordpress/one-time-password-authentication-token/otp-c600/>, 2 pages.

Ricci, Antonio. 'Facing authentication threats: one time passwords and transaction signing.' Security Community Blog [online]. Copyright 2015 Symantec Corporation, Mar. 28, 2013 [site visited Sep. 4, 2014]. Retrieved from the Internet: <URL: http://www.symantec.com/connect/blogs/facing-authentication-threats-one-time-passwords-and-transaction-signing>, 4 pages.

SolidPass Frequently Asked Questions FAQ. solidpass.com [online]. SolidPass™ [site visted Sep. 4, 2014]. Retrieved from the Internet: <URL: http://www.solidpass.com/frequently-asked-questions-faq.html>, 3 pages.

YESsafe Mobile Token. Datasheet. i-sprint.com [online]. Copyright 2015 i-Sprint Innovations [site visited Sep. 4, 2014]. Retrieved from the Internet: <URL: http://www.i-sprint.com/wp-content/uploads/yessafe_token.pdf>, 2 pages.

IBM Worklight application authenticity overview. IBM.com [online]. IBM Corporation [retrieved Feb. 6, 2015]. Retrieved from the Internet: <URL: http://www-01.ibm.com/support/knowledgecenter/SSZH4A_6.1.0/com.ibm.worklight.dev.doc/dev/c_ibm_worklight_app_authentication_overview.html>, 3 pages.

Lee, Chern, 14.8 OpenSSH. FreeBSD Handbook [online]. Copyright 1995-2015 The FreeBSD Document Project [retrieved Feb. 4, 2015]. Retrieved from the Internet: <URL: https://www.freebsd.org/doc/handbook/openssh.html>, 7 pages.

International Search Report and Written Opinion for patent application PCT/US2016/025402 dated Jul. 18, 2016, 14 pages.

Dhamija et al., "Phish and HIPs: Human Interactive Proofs to Detect Phishing Attacks", Second International Workshop on Human Interactive Proofs (HIP 2005), pp. 127-141 (May 1, 2005).

(56) References Cited

OTHER PUBLICATIONS

Youll "Fraud Vulnerabilities in SiteKey Security at Bank of America," http://cr-labs.com/publications/SiteKey-28068718.pdf (Jul. 18, 2006), 16 pages.
"Single Sign-On (SSO)" [site visited Jun. 22, 20015] https://support.ca.com/cadocs/0/CA%20SiteMinder%2012%2052%20SP1-ENU/Bookshelf_Files/HTML/idocs/index.htm?toc.htm?256655.html?intcmp=searchresultclick&resultnum=817, 5 pages.
"Mapping Fed Authn Methods to Authn Levels in OIF / SP" http://prsync.com/oracle/mapping-fed-authn-methods-to-authn-levels-in-oif--sp-624805/ (Jul. 17, 2014), 5 pages.
Puhalla "OpenAM Session Upgrade" http://blog.profiq.cz/2012/09/21/openam-session-upgrade-overview/ (Sep. 21, 2012), 3 pages.
"OpenID Connect Single Sign-On (SSO)" Connect2id Ltd. http://connect2id.com/products/server/single-sign-on (Copyright 2015), 1 page.
"Configuring Authentication Mechanisms" SAP SE [site visited Jun. 22, 20015] https://help.sap.com/saphelp_nw70ehp1/helpdata/en/8f/ae29411ab3db2be10000000a1550b0/frameset.htm 2 pages.
"Designing a good security policy for your websites" http://programmergamer.blogspotin/2013_04_01_archive.html (Apr. 29, 2013) 4 pages.
"Problems viewing or passing CAPTCHA verification" [site visited Jun. 19, 2015] https://help.yahoo.com/kb/SLN2662.html, 1 page.
"One Strong Authentication Solution for Every CA SSO Application" [site visited Jun. 19, 2015] http://www.idfconnect.com/products/sso-mobilekey/, 1 page.
"Show PHP Captcha on Failed Login Attempts" phppot.com http://phppot.com/php/show-php-captcha-on-failed-login-attempts/ (copyright 2008-2014), 6 pages.
SANI "Preventing Brute Force Login Attacks to the Citrix NetScaler Gateway/AAA-™ Login Pages" http://blogs.citrix.com/2012/02/01/preventing-brute-force-login-attacks-to-the-citrix-netscaler-access-gateway-or-aaa-for-tm-login-page-%E2%80%93-part-1/(Feb. 1, 2012), 6 pages.
"How to Configure a Separate Maximum Failure Counter and Threshold for OTP Authentication" [site visited Jun. 18, 2015] https://support.ca.com/cadocs/0/Ca%20SiteMinder%2012%2052%20SP1-ENU/Bookshelf_Files/HTML/idocs/index.htm?toc.htm?1945685.html?intcmp=searchresultclick&resultnum=1805, 2 pages.
*McAfee One Time Password 3.5 Administration Guide.* https://kc.mcafee.com/resources/sites/MCAFEE/content/live/PRODUCT_DOC_UMENTATION/24000/PD24538/en_US/OTP_3_5_admin_guide.pdf (Copyright 2013)120 pages.
"Overload Protection" Paessler AG http://kb.paessler.com/en/topic/25523-what-is-overload-protection(Sep. 28, 2011), 9 pages.
International Application No. PCT/US2016/058016, International Search Report and Written Opinion dated Dec. 7, 2016, 13 pages.
U.S. Appl. No. 14/920,807, Non-Final Office Action dated Feb. 1, 2018, 19 pages.
U.S. Appl. No. 15/294,381, First Action Interview Pilot Program Pre-Interview Communication dated May 21, 2018, 6 pages.
U.S. Appl. No. 15/298,624, Non-Final Office Action dated May 31, 2018, 15 pages.
International Application No. PCT/US2016/058016, International Preliminary Report on Patentability dated May 3, 2018, 10 pages.
U.S. Appl. No. 14/920,807, Notice of Allowance dated Aug. 29, 2018, 7 pages.
U.S. Appl. No. 15/294,381, First Action Interview Office Action Summary dated Aug. 16, 2018, 5 pages.
U.S. Appl. No. 15/299,950, Notice of Allowance dated Aug. 30, 2018, 19 pages.
U.S. Appl. No. 15/299,624, Notice of Allowance dated Nov. 1, 2018, 9 pages.

* cited by examiner

```
                                    400

CONTENT-TYPE: TEXT/HTML;

CHARSET=UTF-8

CONTENT-LANGUAGE: EN

SERVER: APPLICATION-SERVER-11G WEB-CACHE-11G/11.1.1.6.0
      (H;MAX-AGE=300+0;AGE=21;ECID=330795992,0:1)

CONTENT-LENGTH: 38426

DATE: MON, 09 FEB 2015 21:20:35 GMT

TSOTP: ATTR1="RECIPIENT ACCOUNT NUMBER"; VAL1=12345678;
       ATTR2="TRANSFER AMOUNT"; VAL2=1500.95
```

*FIG. 4*

DECLARATIVE TECHNIQUES FOR TRANSACTION-SPECIFIC AUTHENTICATION

FIELD

Embodiments of the invention relate to the field of computing systems; and more specifically to methods, apparatuses, and systems for declarative techniques for transaction-specific authentication.

BACKGROUND

One manner of performing user authentication involves utilizing credentials. Credentials generally refer to various inputs that may be provided by a user that are specific to that user. Examples of credentials include user identifiers (e.g., login name or email address), passwords, biometric data such as a photograph, fingerprint, voice sample, etc. In many systems, a user provides a credential to an authentication server, which can authenticate the user based on the received credentials.

However, with the proliferation of attacks against users, small and large-scale websites, and networks, the need to properly authenticate a user—i.e., determine that a user actually is who they claim to be—before providing service has become critically important. For example, the proliferation of phishing, fake websites, trojans, viruses, spyware, worms, and keystroke loggers has continued to spread, leaving many authentication systems vulnerable as simple credentials may be stolen.

One approach to dealing with such problems is through providing more complex authentication schemes. An authentication scheme may specify a set of credentials to be collected from users, and the manner in which the authentication is to be performed. For example, a simple authentication scheme involves receiving a user identifier (e.g., username or email address) and an associated password, which can be compared with corresponding values known to an authentication server.

A more involved authentication scheme involves using two-factor authentication (or "2FA"). For example, many banking system websites/applications utilize two-factor authentication during a login process. In such schemes, a user must identify themselves to the system by providing something that only the user is supposed to know (e.g., a password or PIN), and providing something that only the user is supposed to have (e.g., a One-Time Password—or OTP—using a two-factor authentication token).

A one-time password is typically a string of numbers (i.e., numeric) or combination of letters and/or numbers (i.e., alphanumeric) that must be provided before a user is provided access to a service. In some scenarios, the OTP may be configured to only be valid for a short period of time to enhance the security of the OTP, after which a new OTP is required. Two-factor authentication tokens are available in different forms, and may include hardware tokens (e.g., "key fobs" or "dongles") or the use of a user-associated mobile device (e.g., cellular phone) to receive a OTP over a separate channel, such as using voice, SMS, or USSD.

One or multiple authentication schemes may be employed by an authentication server to protect one application or many different applications. This may be due to different sensitivities of different resources or functionalities provided by the application or applications.

Another more involved authentication scheme is referred to as transaction signing (or digital transaction signing). Transaction signing requires users to digitally "sign" transactions that may be deemed high risk, and is used to verify the authenticity and integrity of an online transaction. As used herein, a transaction need not refer to a monetary transaction, but may refer to any particular interaction between a user and a system—such as a request to execute a function, change profile data, transfer funds, delete a file, etc. Transaction signing may be thought of as another layer on top of traditional two-factor authentication methods.

In transaction signing, a user (or device of the user) is tasked with confirming a transaction using (at least in part) data that is based upon details of the transaction. For example, an implementation of transaction signing may include executing a keyed hash as a function of a user's private or secret key and transaction details specific to the transaction, which results in a unique string which can be used to verify both the authenticity and integrity of an online transaction.

As one example, a user may be asked to enter a dynamic PIN value, which may be generated based upon information specific to a transaction, such as a recipient account number involved in a funds transfer transaction, a filename involved in a delete file transaction, a new ZIP or area code being provided for a profile update transaction, etc.

Using transaction signing techniques, if an attacker attempts to somehow change details of a requested transaction (e.g., change a recipient account number of a money transfer request), the "signature" would be void and the transaction will not be approved.

Although transaction signing can be an effective method to detect interception and modification of your transactions due to attackers (e.g., malware, viruses, "man-in-the-middle" attackers, etc.), transaction signing has not yet been widely deployed. In particular, it is very difficult and cumbersome for an application developer to add transaction signing protections into an application, as numerous technical and operational challenges are introduced.

For example, many application developers do not have the ability to easily provide hardware tokens to users, utilize separate channels for sending OTPs, etc., and thus these developers would need to increase support needed to help users register tokens, as well as upgrade their application and infrastructure to handle the additional logic to challenge and authenticate the response from customers. Further, transaction signing code tends to be very complex and require intimate knowledge of and/or modification to the application (e.g., know when transaction signing is to be used, know what data is to be used for the authentication, etc.).

Accordingly, there is a tremendous need to find simplified mechanisms to allow applications to implement and benefit from transaction signing authentication techniques.

BRIEF SUMMARY

The present disclosure relates generally to computing systems; and more specifically, to methods, apparatuses, and systems for utilizing declarative requests for transaction-specific authentication. Certain techniques are disclosed herein that enable transaction signing using modular authentication via declarative requests from applications.

In some embodiments, an application seeking additional authentication for a transaction with a user sends a request for transaction signing to an access manager module using a declarative statement indicating what data associated with the transaction is to be used as part of the transaction-signed authentication. In some embodiments, the declarative statement includes one or more transaction factor attributes and one or more corresponding transaction factor values associated with the transaction. The access manager module, in some embodiments, uses this information to perform a transaction-signed authentication with the user independent of the application, and may return a result of the authentication back to the application upon a success or failure. Accordingly, in some embodiments the application—and possibly many other applications relying upon the access manager module—are only required to request transaction signing and then receive the result.

According to some embodiments, an access manager module may be configured to serve one or more applications by performing transaction signing using application-provided transaction factor attributes and transaction factor values. In some embodiments, the access manager module may thus perform transaction-signed authentications without needing knowledge of the particulars of the calling applications such as the particular scenarios where stepped-up authentication may be required, how to identify transaction-specific data to be used for the transaction-signing, or the peculiarities of the application codebases.

In certain embodiments, the requesting-applications may thus flexibly be configured (or decide, even on-the-fly) which one or more transaction factors may be used for a particular authentication, which can increase security by changing up the transaction factors used. Moreover, in some embodiments the applications (and the developers thereof) are relieved of the burden of implementing transaction-signed authentication, and instead can cause such authentication using declarative statements indicating the transaction factors to be used, and await the result of the authentication.

The foregoing, together with other features and embodiments will become more apparent upon referring to the following specification, claims, and accompanying drawings.

BRIEF DESCRIPTION OF THE DRAWINGS

FIG. 4 illustrates a portion of an HTTP header including declarative syntax for requesting transaction-signed authentication utilizing declarative requests according to some embodiments.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain techniques are disclosed herein that enable transaction signing using modular authentication via declarative requests from applications.

In some embodiments, an application seeking additional authentication for a transaction with a user sends a request for transaction signing to an access manager module using a declarative statement indicating what data associated with the transaction is to be used as part of the transaction-signed authentication. In some embodiments, the declarative statement includes one or more transaction factor attributes and one or more corresponding transaction factor values associated with the transaction. The access manager module, in some embodiments, uses this information to perform a transaction-signed authentication with the user independent of the application, and may return a result of the authentication back to the application upon a success or failure. Accordingly, in some embodiments the application—and possibly many other applications relying upon the access manager module—are only required to request transaction signing and then receive the result.

Figure 1:
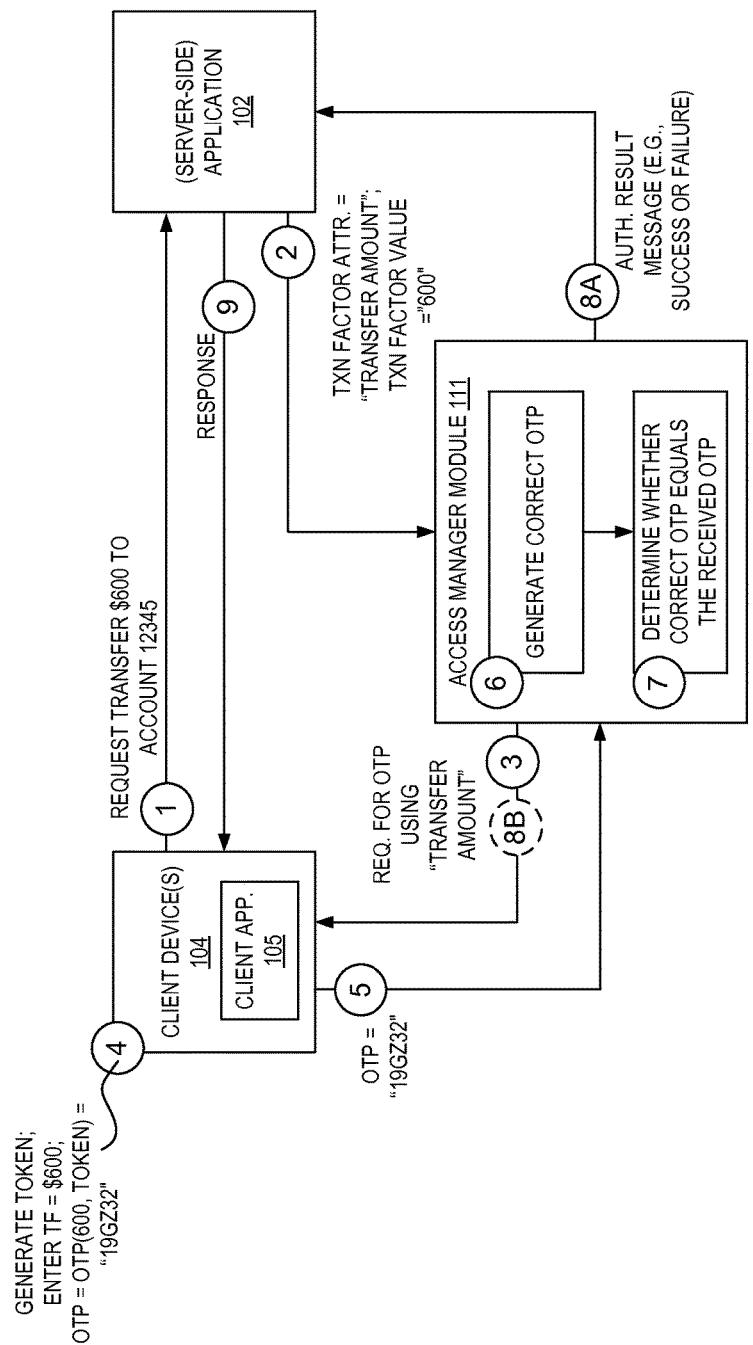
FIG. 1 illustrates a high-level block diagram of a system for utilizing declarative techniques for transaction-specific authentication according to some embodiments.

FIG. 1 illustrates a high-level block diagram of a system 100 for utilizing declarative techniques for transaction-specific authentication according to some embodiments. FIG. 1 presents a high level overview of interactions involving three entities—an application 102 (e.g., a server-side application such as a web application), an access manager module 111, and one or more client devices 104.

Any of the one or more client devices 104, as well as any other computing devices used to implement entities of this system 100, may be of various different types of devices including, but not limited to, personal computers (PCs), desktops, mobile or handheld devices such as laptops, mobile phones, tablets, etc., and other types of devices. In some embodiments only one client device 104 is utilized for the depicted interactions, though in other embodiments a first client device 104 may be used for some of the interactions and a second client device may be used for others of the depicted interactions.

The one or more client devices 104 (e.g., of an end user) may execute a client application 105 such as a web browser to interact with the one or more applications 102 and/or access manager module 111. The client application 105 may be any of many different types of applications, such as a firmware module of the client device 104, an operating system application (or portion thereof, such as a messaging application), a user-space application, etc. For example, client application 105 may be a native application configured to be executed by a particular operating system, a portable application such as a Java-based application, a web browser, an application executed by a web browser, a video game, a word processing or office productivity application, presentation software, etc.

The application 102, in various embodiments, is a server-side application that provides resources to (or receives resources from) the client device 104. In some embodiments, the application 102 can be a "server" side application that acts as a "server" while the client device 104 (or, client application 105) acts as the "client" in a client-server configuration. Thus, in some embodiments the client device 104 transmits requests (e.g., HTTP requests, etc.) to the application 102, and the application 102 can transmit responses (e.g., HTTP responses, etc.) to the requests.

The access manager module 111 may comprise a set of one or more software and/or hardware modules that execute to provide the enforcement of certain access policies for applications 102. For example, access manager module 111 may receive requests sent to applications 102 (or receive requests from applications 102) to validate that a particular user may have access to a particular resource or service of the application 102. The access manager may perform such enforcement using a variety of techniques such as validating user sessions and credentials, which can occur using policies defined by or for applications 102. For example, when a user accesses (or attempts to access) a resource that is protected, access manager module 111 can check if the resource is protected, initiate an initial login process for the user to generate a valid session, validate provided credentials, detect the existence (or lack thereof) of a valid session, etc.

According to some embodiments, the access manager module 111 is configured to allow the application 102 to request an authorization for a particular transaction in a declarative manner, such that the application 102 can stipulate what data associated with the transaction must be provided by the authenticating user. The access manager module 111, in some embodiments, then initiates a transaction-signed user authentication using application-provided data (e.g., transaction factor attributes and transaction factor values), and can notify the application 102 upon a successful authentication. In some embodiments, the access manager module may thus perform transaction-signed authentications without any specific knowledge of the particulars of the specific transaction (or of the application), such as the particular scenarios where stepped-up authentication may be required, how to identify transaction-specific data to be used for the transaction-signing, or the peculiarities of the application 102 codebases.

Turning to FIG. 1, an illustrative high-level flow involving declarative transaction-signing is illustrated graphically using numbers within circles. At circle '1', client device 104 may transmit a request to perform a transaction to the application 102. In the illustrated example, the request is a request to transfer money ($600) from an account of the user to another account with an account identifier of "12345." Of course, as described above, a transaction need not be a monetary transaction, but may refer to any particular interaction between a user and a system—such as a request to execute a function, change profile data, transfer funds, delete a file, etc.

The request may be referred to as including multiple transaction factor attributes and multiple corresponding transaction factor values. For example, a first transaction factor attribute may be a "transaction type" for the transaction, and the first transaction factor value may be "transfer." Similarly, a second transaction factor attribute may be a "transfer amount" and the corresponding second transaction factor value may be "$600." Likewise, a third transaction factor attribute may be a "target account" and the corresponding third transaction factor value may be "12345." Thus, data for a transaction—which may or may not be in the request itself (e.g., it may have been earlier provided/configured)—may include attributes and values for those attributes.

In some embodiments, application 102 receives the request and may determine that an additional authentication should occur. This may occur when a particular request is deemed as sensitive or important, for example. In some embodiments where the application 102 is a financial (e.g., banking, investing, etc.) application, the application 102 may determine that additional authentication is to occur when it receives a request to transfer funds. Similarly, in some embodiments where the application 102 is a data storage application such as online cloud storage or backup service, the application 102 may be configured to determine that additional authentication is to occur when a request to delete data is received, or a request to modify data or read data of another user is received, among many other examples. Accordingly, in some embodiments the application 102 may be configured to identify a particular type of request (of possibly multiple such types) as requiring an authentication. Additionally, in some embodiments the request may be a simple "login" request or another type of request. Thus, applications 102 may be flexibly configured to determine the particular circumstances where an authentication needs to occur before acting on the transaction request.

In the depicted example of FIG. 1, the application 102 has determined that an authentication is to occur, and issues a request at circle '2' for the access manager module 111 to perform the authentication. This request, in some embodiments, is a declarative request allowing the application 102 to identify what particular factors associated with the particular transaction are to be used in the authentication. In this example, the application 102, via the request of circle '2', can stipulate that one transaction factor attribute ("transfer amount") and the corresponding, transaction-specific transaction factor value (here, $600) is to be used in the authentication.

Of course, in other non-illustrated embodiments the application 102 may be configured to identify more than one transaction factor attribute/value pair for the authentication. For example, the application 102 may declare in request (of circle '2') that both the "transfer amount" (first transaction factor attribute) of $600 (first transaction factor value) pair, as well as a "target account" (second transaction factor attribute) of 12345 (second transaction factor value) pair, are both to be used in the authentication.

At circle '3', the access manager module 111 in some embodiments causes a transaction-signed authentication of the user to occur by sending a request for a one-time password (OTP) to one of the client device(s) 104. In some embodiments, this request identifies the one or more transaction factor attributes (e.g., "transfer amount") that the user must provide as part of the authentication, and which can be used to "sign" a one-time password generated by the user.

The request may comprise data sent over HTTP, such as HTML or JavaScript or plain text over one or more communication networks (e.g., the Internet) to the client application 105. In some embodiments, the request may actually be part of an HTTP response, either issued by the access manager module 111 responsive to the request at circle '1', or possibly issued responsive to an additional request made by the client application 105 (e.g., due to the application 102 or a gateway—to be discussed later herein—sending its own response to the circle '1' request, which in turn may be loaded by the client application 105 and cause its issuance of a request for OTP-related data).

In some embodiments, the request may comprise data using another channel, to a same client device 104 as issued the transfer request (circle '1') or to a separate client device 104. For example, in some embodiments the client device 104 issuing the transfer request (circle '1') may be a computer or tablet, for example, and the client device 104 receiving the request (circle '3') may be a mobile telephone.

In some embodiments, the request (circle '3') may be transmitted using a different protocol and/or communications mode than the transfer request (circle '1'). For example, the transfer request (circle '1') may comprise an HTTP request sent by one of the client devices 104 using a wired or wireless (e.g., WiFi) connection to the Internet, whereas the request for one-time password (circle '3') may comprise a SMS message transmitted using cellular communications (e.g., 4G/LTE).

Upon receipt of the request for OTP, the client device 104 can present the transaction factor attribute to the user. For example, the client device 104 can prompt the user that the user must use the "transfer amount" of the requested transaction to generate a signed one-time password.

At this point, at circle '4', in some embodiments, the user utilizes a token generator known to those of skill in the art to generate a token according to a configured token generation algorithm. For example, the user may use a key fob or a security application (e.g., executing on client device 104) to generate a token. In some embodiments, this generation includes the user providing a PIN or simply pressing a software/hardware button to begin the token generation process.

In some embodiments, the generated token is a time-limited token that is "valid" to be used for a limited amount of time—i.e., can only be successfully used within a certain number of minutes after its generation.

Also at circle '4', the user may provide (or input) some or all of the generated token along with the one or more transaction factor values associated with the one or more transaction factor attributes received at circle '6', which can be used to generate a one-time password. For example, the user may enter/type/select one or more digits of the generated token (e.g., a four-digit number, an eight-digit number, a four-character alphanumeric value) into a user input element (e.g., an HTML <input> element) along with the value "600" (or "$600") into the same or a different user input element of a user interface. The user interface may be a webpage provided as part of circle '3', or may be a user interface of a different application such as a token generation program.

In some embodiments, code for the webpage or application receiving the token and the one or more transaction factor values may utilize the transaction factor value(s) to "sign" the token. In some embodiments, this signing may include encrypting the token using the factor value(s) as a key. In some embodiments, the signing may include concatenating the token with the one or more transaction factor values, and calculating a hash of that concatenated value. Of course, other "signing" techniques known to those of skill in the art may be utilized that include using one or more transaction factor values to modify the token according to an algorithm. This "signed" token is now referred to as the transaction-signed one-time password (OTP).

At circle '5', a client device 104—which may be a same or different client device 104 than the one sending the request (at circle '1') or receiving the request for OTP (at circle '3')—provides the transaction-signed OTP to the access manager module 111. In some embodiments, transaction-signed OTP is transmitted using a SMS message, but in some embodiments it may be transmitted using another communication medium/protocol, including but not limited to the Internet or a direct wireless communication such as Bluetooth, ZigBee, etc. In some embodiments, the transmission of the transaction-signed OTP at circle '5' comprises a user transmitting an HTTP POST or GET request carrying the transaction-signed OTP.

At circle '6', the access manager module 111 can generate an expected or "correct" one-time password that should be received from the client device 104. In some embodiments, this occurs responsive to receipt of the OTP (circle '5'), but in some embodiments this may occur at a time after the access manager module 111 receives the transaction factor attributes/values at circle '2'.

In some embodiments, the access manager module 111 generates the "correct" OTP by executing the same token generation algorithm as utilized by the user to generate the token, and using the same one or more transaction factor values (received at circle '2') along with the token to generate the transaction-signed OTP.

Then, at circle '7', the access manager module 111 may determine whether the authentication was valid by determining whether the user-provided transaction-signed OTP (at circle '5') is the same as the "locally" generated correct OTP (at circle '6').

In some embodiments, the access manager module 111 may cause a result of this comparison to be transmitted at circle '8A' to the application 102. For example, in some embodiments, the access manager module 111 causes an authentication result message indicating "success" or "failure" (or the like). The authentication result message can, in some embodiments, include the transaction factor attribute(s) and/or value(s) used as part of the authentication, to allow the application 102 to determine that the user did in fact authenticate using those values.

In some embodiments, the authentication result message (sent at circle '8A') may be signed by the access manager module 111. For example, the access manager module 111 may use a private key associated with the access manager module 111 to encrypt a portion of the authentication result message, which the application 102 can decrypt using a public key associated with the access manager module 111 that is known to the application 102.

Accordingly, the application 102 may, based perhaps upon the result from circle '8A', generate and transmit a response message at circle '9' to respond to the initial request from circle '1'. For example, when the result (of circle '8A') indicates that the user successfully authenticated by providing the valid transaction-signed OTP, the application 102 may perform the requested transfer of funds, and transmit a response verifying the successful performance of the transfer. As another example, when the result (of circle '8A') indicates that the user did not successfully authenticate, the application 102 can transmit a response at circle '9' indicating that the transfer was not performed.

In some embodiments, when the authentication result message sent at circle '8A' indicates a failure, the application 102 may, in addition to or instead of circle '9', cause another authentication attempt by transmitting a message similar to the circle '2' transmission of the transaction factor attribute(s)/value(s).

In some embodiments, when it is determined that the user did not successfully authenticate (i.e., provide a OTP that matches a correct OTP), the access manager module 111 itself may forego transmitting a message to the application 102 (i.e., skip circle '8A') but may instead cause the user to attempt to authenticate again (at circle '8B'). This can occur without the application 102 being notified, until the user does successfully authenticate, the user reaches a configured allowed "incorrect authentication attempt" threshold (e.g., incorrectly attempts to authenticate 5 consecutive times over a period of time), the user fails to authenticate within a particular time period, etc. At that point, the access manager module 111 may finally transmit the authentication result message at circle '8A' to the application 102.

In this manner, the access manager module may perform transaction-signed authentications without needing knowledge of the particulars of the calling application 102 such as the particular scenarios where stepped-up authentication may be required, how to identify transaction-specific data to be used for the transaction-signing, or the peculiarities of the application's codebase.

Thus, the requesting-applications 102 may thus flexibly be configured (or decide, even on-the-fly) which one or more transaction factor attribute(s)/value(s) may be used for a particular authentication. This can increase the security of the application by changing up the transaction factors used such that an attacker cannot focus in upon any combination of transaction factors. Moreover, the application 102 (and its developer) is relieved needing to implement transaction-signed authentication itself, and instead can cause such authentication using declarative statements indicating the transaction factors to be used, and simply await the result of the authentication.

Figure 2:
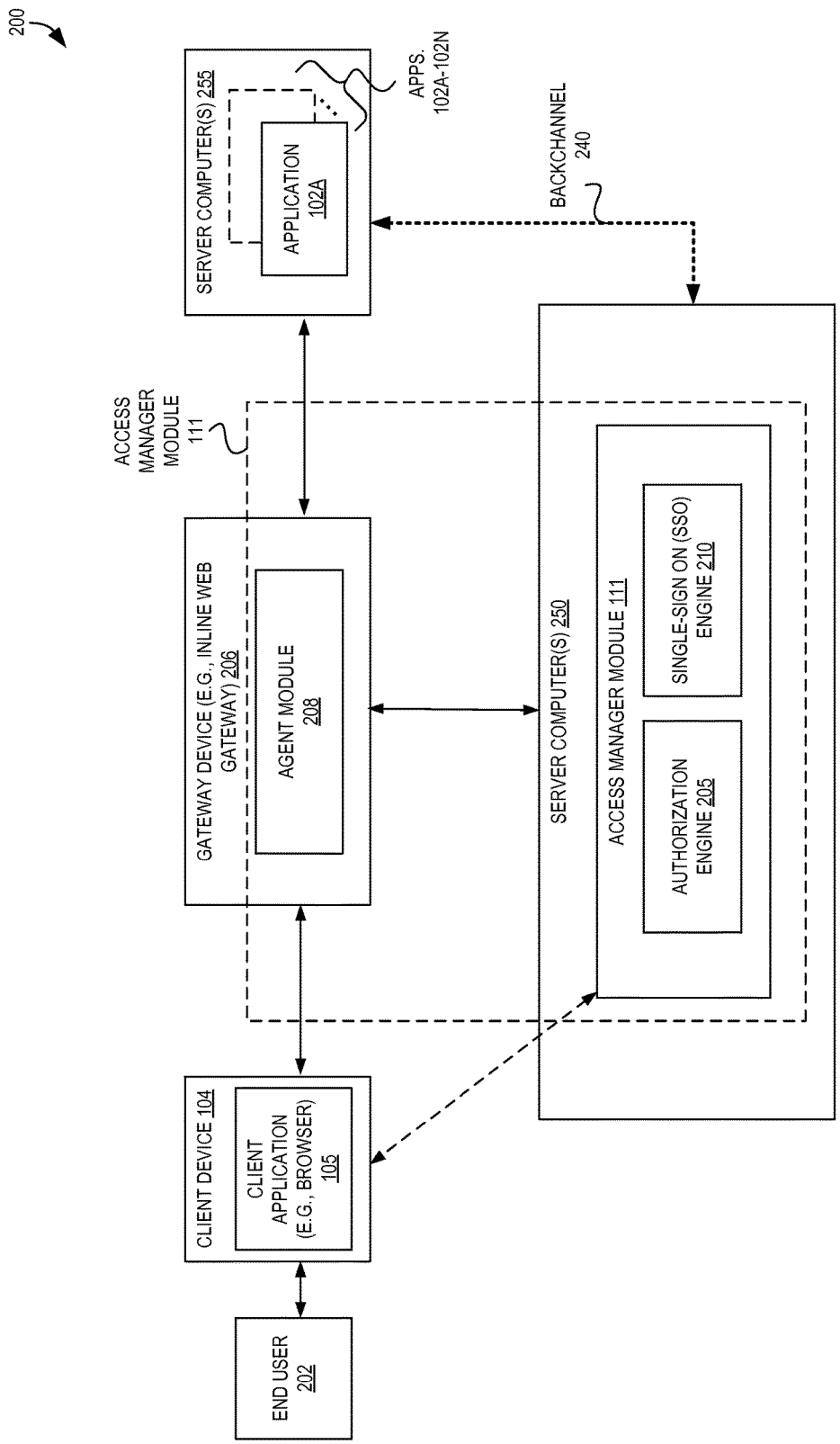
FIG. 2 illustrates a block-diagram of exemplary hardware elements in a system for utilizing declarative techniques for transaction-specific authentication according to some embodiments.

Having now provided a high level overview of some aspects of the system 100, we now turn to an illustrative hardware environment for providing the disclosed declarative transaction-signed authentication. FIG. 2 illustrates a block-diagram of exemplary hardware elements in a system 200 for utilizing declarative techniques for transaction-specific authentication according to some embodiments.

In this exemplary embodiment, the system 200 includes server computer(s) 250 implementing the access manger module 111, server computer(s) 255 executing one or more applications 102A-102N, gateway device 206 implementing agent module 208, client device 104 executing a client application 105, and end user 202. However, in other embodiments, one or more of these modules and applications may be implemented (or execute) in different locations. For example, in some embodiments, the access manager module 111 can execute on a same device (e.g., gateway device 206) with the agent module 208, and in some embodiments can execute on a same device as one or more of the applications 102A-102N.

The server computers (250, 255) can include one or more physical network interfaces (not illustrated) to communicatively couple the server computers with other computing devices (e.g., gateway device 206, client device 104, etc.) across one or more communication networks. The one or more communication networks can include networks of various types, each possibly including one or more networking devices or equipment including but not limited to network switches, routers, bridges, load balancers, etc. Examples of one or more communication networks include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), Open-Flow, IPX (Internetwork Packet Exchange), SAN (Storage Area Network) protocols, AppleTalk, Bluetooth, Long-Term Evolution (LTE), and other protocols.

One configuration utilized in some embodiments is represented using solid bordered entities. In this configuration, the access manager module 111 (at server computers 250) can be a distinct entity than the agent module 208 (at gateway device 206). However, as illustrated with dashed lines, access manager module 111 can be viewed as a local or distributed module including the agent module 208 as well as the authorization engine 205 and single-sign on (SSO) engine 210, which can execute at different physical locations.

As depicted in FIG. 2, traffic between client device 104 and application 102A can flow through an agent module 208, which can execute at a gateway device 206 such as an inline web gateway. For example, the gateway device 206 can be configured an in inline deployment such that all traffic of a particular type or protocol (e.g., HTTP traffic) between the application 102A and client device 104 must flow through the gateway device 206. The gateway device 206, in some embodiments, can be configured as a proxy/endpoint and terminate connections, or can be configured transparently and thus monitor traffic but not terminate a connection. Of course, other possible deployment configurations are possible and known to those of skill in the art. As one example, agent module 208 can execute at a same server computer 255 as one or more of applications 102A-102N, and thus, a gateway device 206 may or may not be involved.

The agent module 208—here depicted as executed by gateway device 206—can be a software module, plug-in, etc., configured to selectively interact with the applications 102A-102N and/or access manager module 111 to assist with the operations described herein. For example, agent module 208 can be configured according to a set of rules (or policies) to selectively forward (and/or generate) traffic toward applications 102A-102N and/or access manager module 111.

Thus, in some embodiments agent module 208 can be configured to examine received traffic (e.g., HTTP requests) from a client application 105 and selectively forward the traffic to access manager module 111 based upon one or more configured rules. In some embodiments, agent module 208 can be configured to examine received traffic (e.g., HTTP responses) sent by one or more of applications 102A-102N and selectively forward the traffic to access manager module 111. Additionally, agent module 208 can be configured to receive traffic from access manager module 111 and forward it to one or more of applications 102A-102N, for example.

In some embodiments, agent module 208 is configured to intercept requests for resources provided by applications 102A-102N, and transmit these requests (or send modified requests or commands) to access manager module 111 for the purpose of authentication and/or authorization.

Upon receipt of such a forward request, access manager module 111 can determine whether the end user 202 (or, more specifically, client application 105) is authenticated to access the particular resource and/or authorized to access the resource using SSO engine 210 and/or authorization engine 205.

SSO engine 210 can provide "login" (or other authentication) functionalities, and can be configured to provide users the ability to access one or multiple protected resources (e.g., web pages and applications) with a single authentication. Accordingly, SSO engine 210 of the access manager module 111 can eliminate the need for additional or different logins to access other applications (e.g., access any of applications 102B-102N in addition to a first application 102A) at a same or lower authentication level during a same session. Accordingly, SSO engine 210 can be configured to manage a session lifecycle, facilitate global logout across one or more relying applications 102A-102N for valid sessions, and provide service across multiple protocols.

Authorization engine 205 can be configured, with a received request, determine whether the particular end user 202 (or, client application 105/client device 104) is allowed access to a particular resource or service provided by the one or more applications 102A-102N. Thus, authorization engine 205 can, for a received request, determine whether requesting user is authorized to access the requested resource (e.g., using policies). If authorization exists, authorization engine 205 can instruct the agent module 208 to pass on the request to the involved application 102A or directly send the request or an instruction to the application, possibly over backchannel 240. If no authorization exists, authorization engine 205 can cause the access to be blocked (e.g., transmit an instruction to agent module 206 to block the request) and/or cause the end user 202 to be notified that access is not allowed to the requested resource.

In some embodiments, an application 102A may be configured to communicate with access manager module 111 either through the agent module 208 (e.g., sending API requests, sending HTTP messages including a certain flag—such as in the HTTP header fields, etc.) or perhaps directly through a backchannel 240 that can be a direct connection between server computers 255 and server computers 250 or simply a trusted connection that may not flow through gateway device 206.

For example, application 102A may receive a request to access a particular resource or perform a particular action. In response, the application 102A may be configured to require additional end user 202 authentication, such as a "stepped-up" authentication. In some embodiments, application 102A can thus flexibly request access manager module 111 to perform the authentication. This request can be made in a declarative manner, such that the application 102A simply requests what authentication needs to be performed, and not how the authentication is to occur, which can relieve the burden of the application's developers to be concerned with the complexities of such authentication schemes. Some examples of such interactions are now presented with regard to FIG. 3 and FIG. 4.

Figure 3:
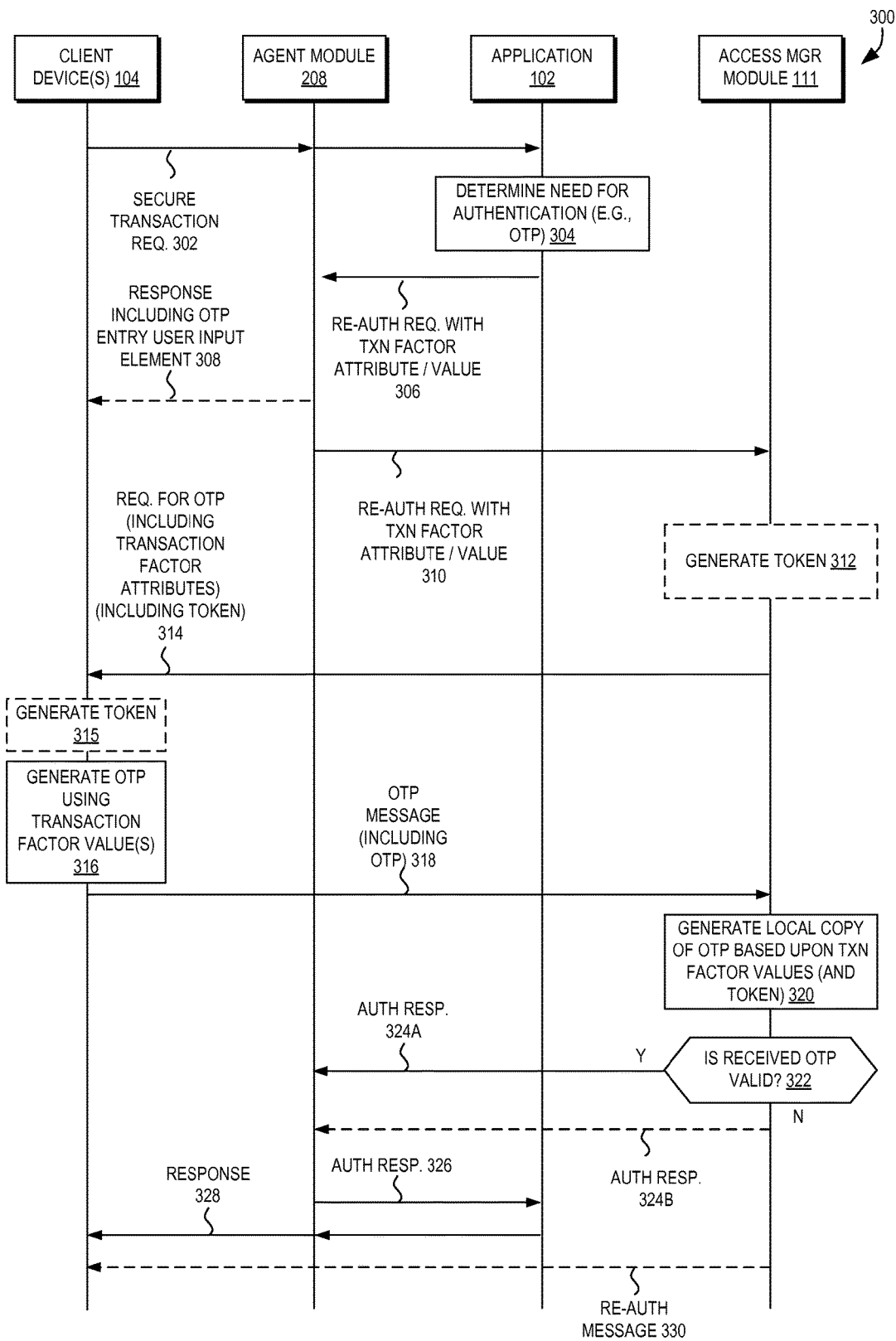
FIG. 3 illustrates a combined sequence and flow diagram for application-initiated transaction-signed authentication utilizing declarative requests according to some embodiments.

FIG. 3 illustrates a combined sequence and flow 300 for application-initiated transaction-signed authentication utilizing declarative requests according to some embodiments. FIG. 3 illustrates some exemplary messaging and operations involving a client device 104 of an end user, an agent module 208, an application 102, and an access manager module 111. These depicted messages and operations are exemplary and presented at a high level for ease of illustration; accordingly, those of skill in the art would immediately recognize that there are many ways to implement the messages and operations depicted herein.

Within the context of FIG. 3, we assume that client device 104 (or end user/client application) has already been authenticated to interact with application 102 in at least a limited manner. Thus, in this context we describe "re-authentication", though of course in other embodiments and/or scenarios an initial authorization is not at all required or performed.

In this depiction, a client device 104 may transmit a request 302 message (e.g., an HTTP request message) to application 102, which may flow through agent module 208. From the perspective of the application 102, this request 302 may be a "secure" transaction request that the application 102 of higher importance. For example, request 302 may be a request to transfer money from an account, delete a particular file or resource, view sensitive correspondence or material, etc.

In this depiction, agent module 208 may or may not have forwarded the request 302 to access manager module 111 for authorization and/or authentication purposes, and that other authorization and/or authentication operations may occur before the request 302 is provided to application 102. Thus, we assume that at some point—immediately or at some other point—agent module 208 passes the request 302 to application 102.

Thus, application 102 at block 304 can be configured to identify certain requests (e.g., request 302) as requiring enhanced authentication on the part of the end user. For example, application 102 can be configured to identify all requests of a particular type or for a particular resource as requiring enhanced authentication. Thus, the application 102 may be configured to require that a transaction-signed one-time password authentication occur before providing access to a resource or performing a requested operation.

Accordingly, application 102 can transmit a "re-authentication" request message 306 back to agent module 208. The re-authentication request message 306 may comprise an HTTP response message, for example, which may composed with the agent module 208 or even the client device 104 as the recipient. In some embodiments, the re-authentication request message 306 includes a flag indicating that the application 102 seeks re-authentication, which may comprise a particular value set within an HTTP header field indicating the request.

In some embodiments, the re-authentication request message 306 includes one or more transaction factor attribute(s) and/or transaction factor value(s) as described earlier with regard to FIG. 1. These transaction factor attribute(s) and/or transaction factor value(s) may be taken from (or otherwise associated with) data from the transaction request 302 itself, such as a transaction amount, name of a file, recipient identifier, etc. Accordingly, the request 306 can be viewed as declarative, as it indicates what data associated with the transaction is to be used as part of the requested transaction-signed authentication.

In some embodiments the re-authentication request message 306 does not include the one or more transaction factor attribute(s) and/or transaction factor value(s), and instead, the application 102 provides the one or more transaction factor attribute(s) and/or transaction factor value(s) to the access manager module 111 in a different manner, such as using a secure backchannel 240.

For one example of a re-authentication request message 306, we now turn to FIG. 4, which illustrates a portion 400 of an HTTP header including declarative syntax for requesting transaction-signed authentication utilizing declarative requests according to some embodiments. As described herein, the re-authentication request message 306 can comprise an HTTP request or response message. HTTP messages can included HTTP "headers" including HTTP header fields and associated HTTP header values. HTTP headers are components of a header section of HTTP messages that can define operating parameters of an HTTP transaction.

A core set of fields is standardized by the Internet Engineering Task Force (IETF) in RFC 7231. An official registry of these fields as well as those of supplementary specifications is maintained by the Internet Assigned Numbers Authority (IANA). However, additional field names and permissible values may be defined by particular applications.

For example, the illustrated portion 400 of an HTTP header includes "Content-Type", "Charset", "Content-Language", "Server", "Content-Length", and "Date" header fields that are standard header fields that are commonly used. However, the illustrated portion 400 also includes a "TSOTP" header field, which is a non-standard field not commonly used throughout the Internet, and can be configured for use in the OTP-systems described herein.

In some embodiments where the re-authentication request 306 is sent to (or through) an agent module 208, the agent module 208 can be configured to examine the HTTP headers, and when a "TSOTP" header field (or some other defined header field) exists, determine that the message constitutes a re-authentication request.

In this example, the TSOTP header field includes several key-value pairs separated by semicolons. This example includes two transaction factor attributes (ATTR1="Recipient Account Number" and ATTR2="Transfer Amount") and two associated transaction factor values (VAL1=123455678 and VAL2=1500.95). Accordingly, the application 102 has declaratively indicated that the authentication is to utilize these transaction factor attributes and values.

In addition to transaction factor attributes/values, other data can be carried in this portion 400 that is related to re-authentication. As one example, an indicator of whether multiple authentication attempts are allowed or should be performed may be included. Similarly, other similar declarative values may be indicated that allow the application 102 to control how exactly the authentication is to occur, despite the application 102 not needing to be involved in those processes.

Turning back to FIG. 3, upon receipt of the re-authentication request message 306, agent module 208 identifies that the application 102 is seeking the re-authentication.

Optionally, in some embodiments, agent module 208 can be configured to provide a response 308 to the client device 104 indicating that the authentication is sought, which may include instructions for providing a one-time password entry user input element such as a text box, for example.

In some embodiments, agent module 208 transmits a re-authentication request 310 to the access manager module 111, which may or may not include the one or more transaction factor attribute(s) and/or transaction factor value(s), as described above. In those configurations where the re-authentication request 310 does not include the one or more transaction factor attribute(s) and/or transaction factor value(s), the access manager module 111 may solicit (i.e., request) this data from the application 102, wait for the data to be provided, etc.

The access manager module, in some embodiments, uses one or more transaction factor attribute(s) and/or transaction factor value(s) to initiate a transaction-signed authentication with the end user independent of the application 102.

In some embodiments, the access manager module 111 may generate a token (itself, or by interacting with a token-generating entity/system) at block 312 for the authentication, though this is not utilized in some embodiments.

The access manager module 111 then generates and transmits a request 314 for a one-time password to client device 104. This transmission may or may not occur via the agent module 208. For example, this request may comprise a transmission over a different (e.g., non-HTTP) communication channel such as SMS, email, a push-notification, etc.

In some embodiments, this request 314 includes the transaction factor attributes. For example, the request 314 may indicate that the end user is to provide the "transaction amount" (a first transaction factor attribute) and/or a "recipient last name" (a second transaction factor attribute) for a transaction involving a requested funds transfer.

In some embodiments, this request 314 includes a token (which may have been generated at block 312) that the end user must provide as part of the authentication. Of course, the use of the token is not included in all embodiments.

In some embodiments, the client device 104 generates a token, perhaps using a token generator software module or device known to those of skill in the art of authentication.

Accordingly, the end user can generate, at block 316, the requested one-time password using the one or more transaction factor values associated with the one or more transaction factor attributes (provided via request 314). For example, the end user may input the one or more transaction factor values into a one-time password generator known to those of skill in the art.

In some embodiments, the end user may also enter a token (e.g., the token optionally generated at block 312 or block 315) during the one-time password generation process.

In some embodiments, the generated one-time password is entered into a one-time password entry user input element of a webpage or application (e.g., displayed responsive to optional response 308 or request 314), and provided back to the access manager module 111 in OTP message 318.

Access manager module 111 then, at block 320, can generate its own "local" version of the one-time password based upon the transaction factor values (and optionally, generated token). Of course, this block 320 can occur earlier in other embodiments, typically any time after the re-authentication request 310 is received by the access manager module 111. Thus, in some non-illustrated embodiments block 320 occurs prior to receipt of the OTP message 318.

At block 322, access manager module 111 determines whether the generated OTP (block 320) matches the received OTP (from OTP message 318).

If a match results—i.e., the OTP is correct—the end user has been successfully authenticated, and the access manager module 111 can transmit a "positive" authentication result response message 324A to application 102, which can be in response to the re-authentication request 306. This authentication result response message 324A can be directed to (or flow through) agent module 208, which can transmit the same (or similar) message 326 to the application 102. In some embodiments the authentication response message 324A/326 includes a result indicator (e.g., a "yes/no" value), and in some embodiments the message 324A/326 can include associated authentication data, such as indicators of the transaction factors attribute(s) and/or transaction factor value(s) provided by the end user during authentication.

In some embodiments, authentication response message 324A/326 (or authentication response 324B, discussed later) may be "signed" by the access manager module 111 using a private key, which can then be decrypted using a public key associated with the access manager module 111. For example, in some embodiments using signed messages 324A/324B/326, the application is able to utilize a public key of the access manager module 111 to verify that the message is legitimate, and thus an attacker is not fraudulently attempting to create a fake message.

Accordingly, the application 102, upon receipt of a "positive" authentication response message 324A/326, may be configured to verify that the authentication was successful, and can perform the requested transaction (or provide the requested resource) responsive to request 302, and thus transmit response 328.

In some embodiments, when the received OTP does not match the locally generated OTP at block 322, the access manager module 111 may similarly transmit a "negative" authentication result response message 324B to application 102, which may flow through the agent module 208 and be sent on to the application 102 as authentication result response message 326.

The application 102 can then identify the failed authentication, and act according to its configuration, which can include transmitting a "request denied" type message as response 328 to the client devices 104. In some embodiments, the application 102 can possibly transmit another re-authentication request 306 to initiate another re-authentication.

However, in some embodiments, when the received OTP does not match the locally generated OTP at block 322, the access manager module 111 can be configured to automatically initiate another OTP-based authentication attempt (e.g., one or more times—per policy, rule, or as indicated in a declarative instruction within re-authentication request 306/310) by sending re-authentication message 330, which can be similar to the request for OTP message 314 sent earlier.

Figure 5:
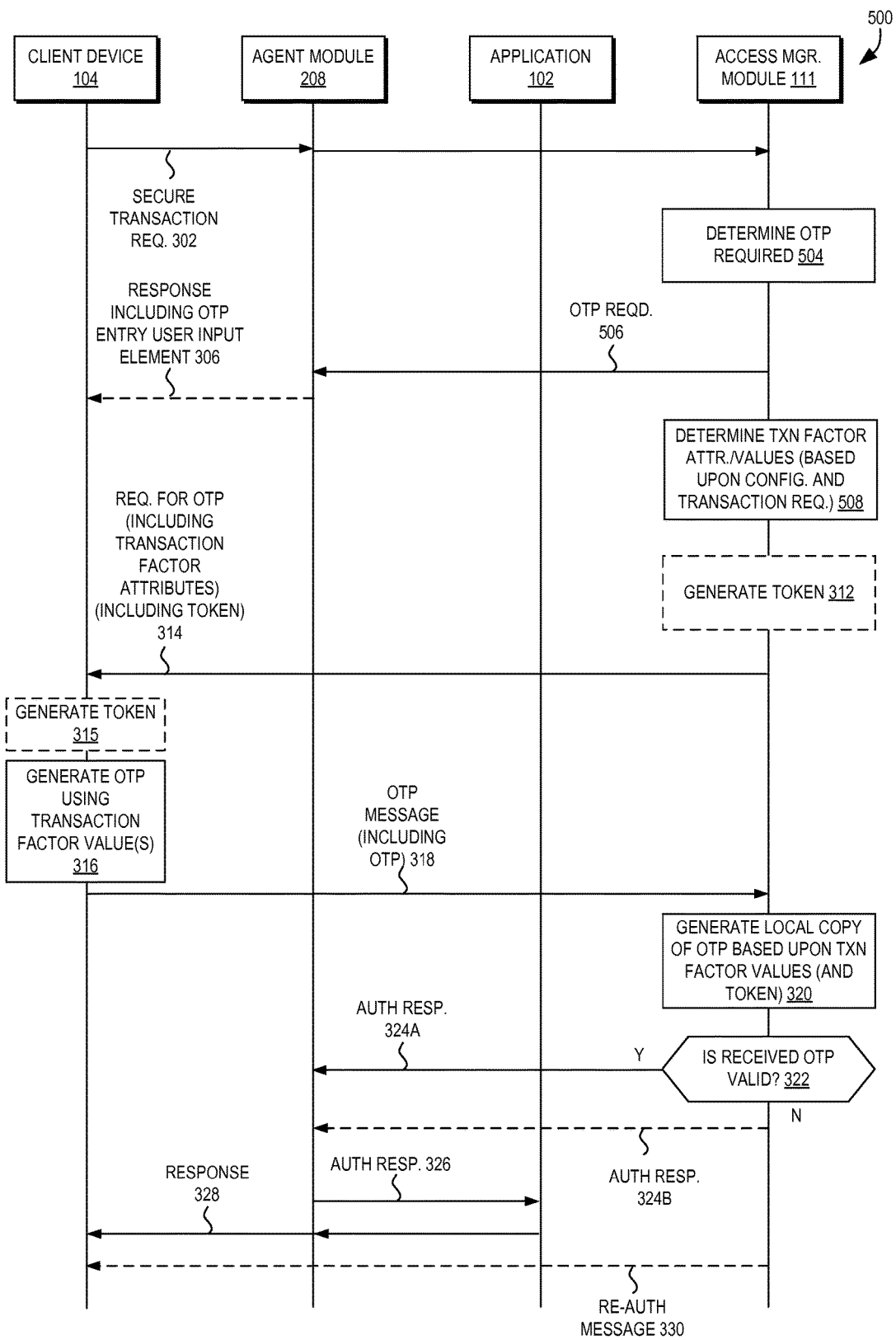
FIG. 5 illustrates a combined sequence and flow diagram for policy-configured transaction-signed authentication utilizing declarative requests according to some embodiments.

Another exemplary process is described in FIG. 5, which illustrates a combined sequence and flow diagram 500 for policy-configured transaction-specific authentication utilizing declarative requests according to some embodiments. As illustrated in this diagram 500, the access manager module 111 can be configured to pro-actively initiate an authentication using a transaction-signed OTP. This can occur according to a configuration, such that application 102 can "configure"—using declarative statements—the access manager module 111 to identify scenarios where such authentication is to occur and/or identify the transaction factors involved.

This diagram 500 again includes a client device 104 sending a request 302 (e.g., for a secure transaction requiring additional authentication), though in this scenario the request 302 is forwarded by the agent module 208 to the access manager module 111. Based upon features of the request (e.g., portions of the requested URL/URI such as a filename or directory structure, perhaps), the access manager module 111 can determine that a transaction-signed OTP authentication is to occur at block 504. Again, the logic for this determination 504 can be provided from application 102 using declarative statements (e.g., code indicating that OTP authentication occurs for all request URLs including "/transfer_money/").

In some embodiments, access manager module 111 transmits a OTP required 506 message to agent module 208, which, in some embodiments, causes the agent module 208 to not yet forward the request 302 to the application 102, and can cause the agent module 208 to transmit the response 306 to the client device 104 as described with respect to FIG. 3.

At block 508, access manager module 111 determines the transaction factor attributes and/or values, which can be based upon the earlier configuration (e.g., from application 102) and can be based upon data contained within the request 302. For example, access manager module 111 may be configured to seek transaction factor value data from within the request 302 associated with a "Recipient Account Number" (transaction factor attribute) using provided selection logic. Thus, the transaction factor attribute(s) can be declared per configuration or identified within the request, for example. Additionally, the transaction factor value(s) can be identified from the request.

At this point, the remainder of the flow/sequence can continue similar to as described in FIG. 3.

Figure 6:
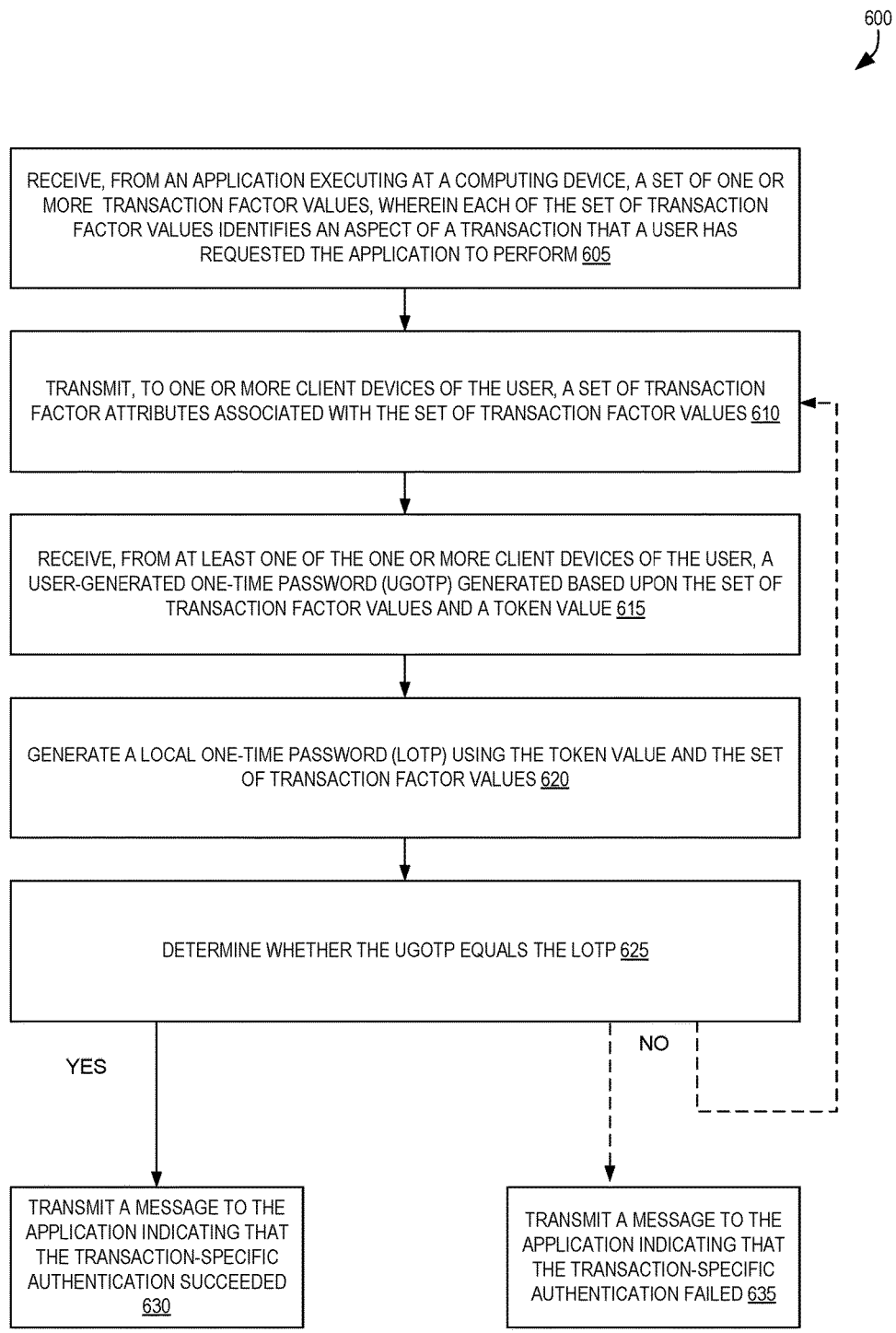
FIG. 6 illustrates an exemplary flow for utilizing declarative techniques for transaction-specific authentication according to some embodiments.
Figure 7:
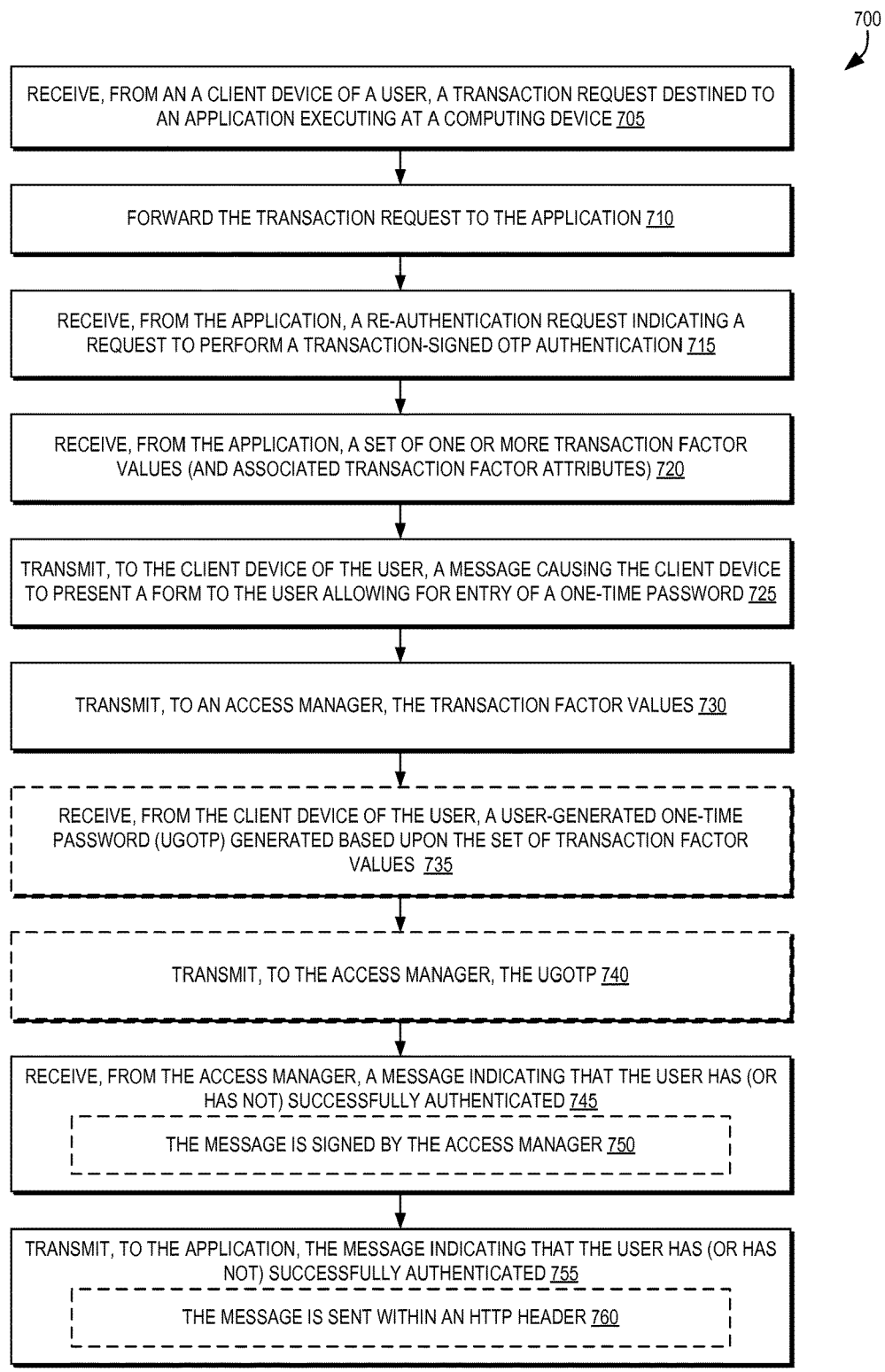
FIG. 7 illustrates an exemplary flow for utilizing declarative techniques for transaction-specific authentication according to some embodiments.

We now turn to exemplary flows in accord with some embodiments in regard to FIG. 6 and FIG. 7. The operations of these flows is described with reference to the exemplary embodiments of the other diagrams, such as FIG. 1 and/or FIG. 2. However, it should be understood that the operations of these flow diagrams can be performed by embodiments other than those discussed with reference to these other diagrams, and the embodiments discussed with reference to these other diagrams can perform operations different than those discussed with reference to the flow diagrams. Also, though the flow diagrams in these figures show a particular order of operations performed by certain embodiments, it should be understood that such order is exemplary. Thus, it is expressly stated that other embodiments can perform the operations in a different order, combine certain operations, overlap certain operations, etc.

FIG. 6 illustrates an exemplary flow 600 for utilizing declarative techniques for transaction-specific authentication according to some embodiments. In some embodiments, flow 600 can be performed in an access manager module 111 using software, hardware, or a combination thereof.

Flow 600 includes, at block 605, receiving, from an application executing at a computing device, a set of one or more transaction factor values. Each of the set of transaction factor values identifies an aspect of a transaction that a user has requested the application to perform. Block 605, in some embodiments, also includes receiving a set of one or more transaction factor attributes associated with the set of transaction factor values. The received set of one or more transaction factor values may be received within one or more HTTP header fields of an HTTP message.

Flow 600 includes, at block 610, transmitting, to one or more client devices of the user, a set of transaction factor attributes associated with the set of transaction factor values. This transmitting may include transmitting the set of transaction factor attributes via a different communication channel than which the set of one or more transaction factor values was received at block 605. For example, the set of one or more transaction factor values received at block 605 may arrive as HTTP traffic, and the set of transaction factor attributes may be sent as a SMS message.

The set of transaction factor attributes, in some embodiments, is sent to a separate client device of the user than the client device used when the user requested the transaction to be performed.

Flow 600 also includes, at block 615, receiving, from at least one of the one or more client devices of the user, a user-generated one-time password (UGOTP) generated based upon the set of transaction factor values and a token value. For example, the user may generate the token value using a token generator, and provide the token value as well as the set of transaction factor values to a one-time password generator, which results in a generation of a transaction-signed (i.e., transaction-specific) one-time password. Some (e.g., a subset of created digits) or all of this transaction-signed one-time password may be provided as the UGOTP, which may occur by entering the UGOTP into a web or application form and submitting it.

Flow 600 also includes, at block 620, generating a local one-time password (LOTP) using the token value and the set of transaction factor values, and at block 625, determining whether the UGOTP equals/matches the LOTP.

If the UGOTP does equal/match the LOTP, flow may continue with block 630 and transmitting a message to the application (directly, or indirectly through an agent module) indicating that the transaction-specific authentication succeeded. The message, in some embodiments, includes the utilized transaction factor attribute(s) and/or transaction factor value(s) used in the authentication.

If the UGOTP does not equal/match the LOTP, flow may continue with block 635 and transmitting a message to the application (directly, or indirectly through an agent module) indicating that the transaction-specific authentication did not succeed.

In some embodiments, flow may alternatively (or in addition) proceed back to block 610 one or more times to thereby attempt another transaction-signed OTP authentication.

FIG. 7 illustrates an exemplary flow for utilizing declarative techniques for transaction-specific authentication according to some embodiments. In some embodiments, flow 700 can be performed in an agent module 208 using software, hardware, or a combination thereof.

Flow 700 includes, at block 740, receiving, from an a client device of a user, a transaction request destined to an application executing at a computing device. The transaction request may comprise an HTTP request message, and may include one or more transaction factor values. Flow 700 also includes, at block 710, forwarding the transaction request to the application.

Flow 700 also includes, at block 715, receiving, from the application, a re-authentication request indicating a request to perform a transaction-signed OTP authentication. The re-authentication request may comprise an HTTP response message.

Flow 700 also includes, at block 720, receiving, from the application, a set of one or more transaction factor values. In some embodiments, block 720 also includes receiving one or more transaction factor attributes corresponding to the received transaction factor values. These received transaction factor values (and possibly transaction factor attributes) can be received within the same request of block 715. For example, this data may be carried within an HTTP header of an HTTP message.

Flow 700 also includes, at block 725, transmitting, to the client device of the user, a message causing the client device to present a form to the user allowing for entry of a one-time password. At block 730, the flow 700 includes transmitting, to an access manager module, the transaction factor values. Block 730 may comprise forwarding a HTTP message (see blocks 715 and/or 720) to the access manager module.

Flow 700 optionally includes, at block 735, receiving, from the client device of the user, a user-generated one-time password (UGOTP) generated based upon the set of transaction factor values, and transmitting, at block 740, the UGOTP to the access manager. In some embodiments, though, the UGOTP is provided from the client device to the access manager without passing through the agent module, and thus these blocks 735/740 do not occur in some embodiments.

Flow 700 also includes, at block 745, receiving, from the access manager, a message indicating that the user has (or has not) successfully authenticated. In some embodiments, block 745 includes block 750, where the message is signed by the access manager using a private key.

Flow 700 also includes, at block 755, transmitting, to the application, the message (of block 745) indicating that the user has (or has not) successfully authenticated. In some embodiments, the message may be sent (at block 760) within an HTTP header.

Figure 8:
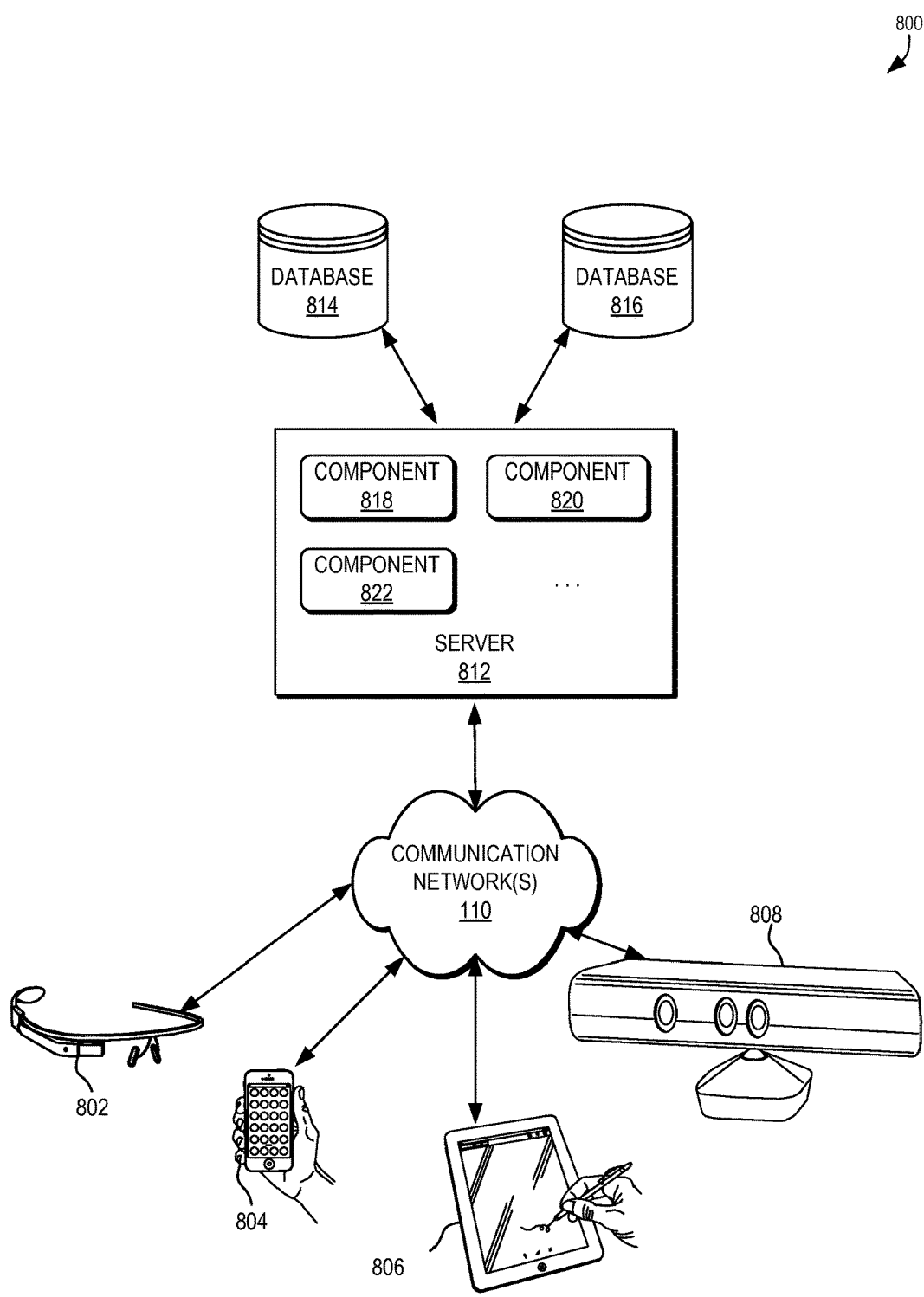
FIG. 8 illustrates a simplified diagram of a distributed system for implementing some embodiments.

FIG. 8 illustrates a simplified diagram of a distributed system for implementing some embodiments of the present invention. In the illustrated embodiment, distributed system 800 includes one or more client computing devices 802, 804, 806, and 808 (e.g., examples of client device 104), which are configured to execute and operate a client application (e.g., application 105) such as a web browser, proprietary client (e.g., Oracle Forms), or the like over one or more network(s) 110. Server 812 may be communicatively coupled with remote client computing devices 802, 804, 806, and 808 via network 110, and may operate as server computer 250 and/or server computer 255, etc.

In various embodiments, server 812 may be adapted to run one or more services or software applications such as services and applications that provide code and/or data for performing transaction-signed one-time password authentication for applications executing at the server 812 or another server. In certain embodiments, server 812 may also provide other services or software applications that can include non-virtual and virtual environments. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, software components 818, 820 and 822 of system 800 are shown as being implemented on server 812. As one example, one or more of the components (e.g., software component 818) may be the access manager module 111, agent module 208, authorization engine 205, SSO engine 210, and/or application(s) 102A-102N discussed throughout the application.

In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

Client computing devices 802, 804, 806, and/or 808 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 800 in FIG. 8 is shown with four client computing devices, any number of client computing devices may be supported. Other devices, such as devices with sensors, etc., may interact with server 812.

Communication network(s) 110 in distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server (e.g., servers 250/255) for performing processing as described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

Distributed system 800 may also include one or more databases 814 and 816. These databases may provide a mechanism for storing information such as user interactions information, usage patterns information, adaptation rules information, and other information used by embodiments of the present invention. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands. However, databases 814 and 816 may provide relational databases, object-oriented databases, object-relational databases, NoSQL databases, etc., and may or may not be SQL-based. For example, databases 814 and/or 816 may be Oracle Database, PostgreSQL, Microsoft SQL Server, MySQL, MemSQL, Memcached, Redis, MongoDB, BigTable, Cassandra, DB2, Solr, etc.

Figure 9:
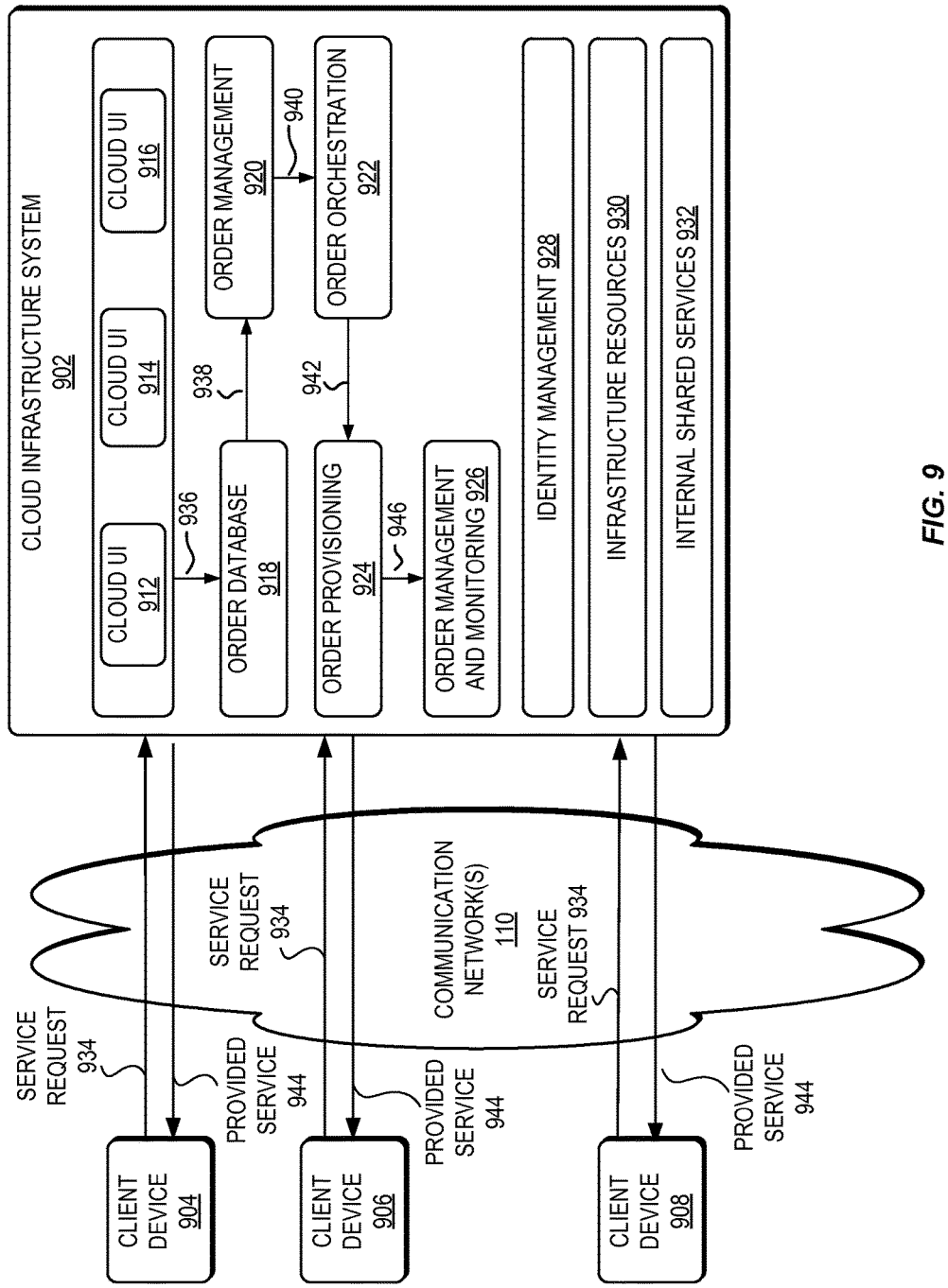
FIG. 9 is a simplified block diagram of one or more components of a system environment in which services may be offered as cloud services, in accordance with some embodiments.

In some embodiments, code and/or data for transaction-signed one-time password authentication may be offered as services via a cloud environment. FIG. 9 is a simplified block diagram of one or more components of a system environment 900 in which services may be offered as cloud services, in accordance with some embodiments of the present disclosure. In the illustrated embodiment in FIG. 9, system environment 900 includes one or more client computing devices 904, 906, and 908 that may be used by users to interact with a cloud infrastructure system 902 that provides cloud services. Additionally, in some embodiments the "client" computing devices 904, 906, 908 may actually be server computers (e.g., server computer 250/255) acting as a client in a client-server relationship, where the server may provide transaction-signed one-time password authentication and/or database services. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Communication network(s) 110 may facilitate communications and exchange of data between clients 904, 906, and 908 and cloud infrastructure system 902. Each network may be any type of network familiar to those skilled in the art that can support data communications using any of a variety of commercially-available protocols, including those described above for communication network(s) 110.

In certain embodiments, services provided by cloud infrastructure system 902 may include a host of services that are made available to users of the cloud infrastructure system on demand. In addition to services related to providing code and/or data for transaction-signed one-time password authentication operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database-as-a-Service (DaaS) in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 922 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services.

For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
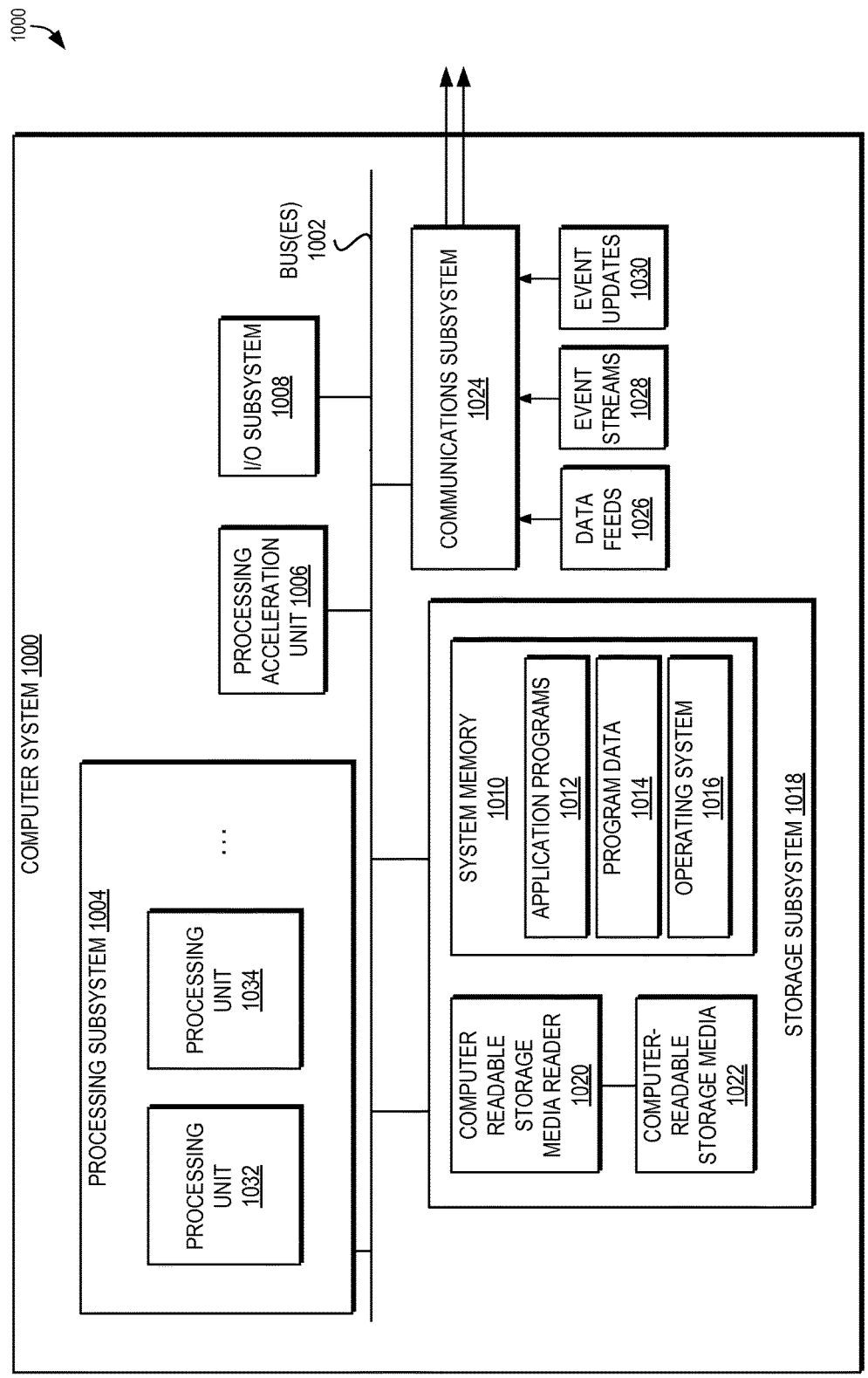
FIG. 10 illustrates an exemplary computer system that may be used to implement certain components according to some embodiments.

FIG. 10 illustrates an exemplary computer system 1000 that may be used to implement certain components according to some embodiments of the present invention. In some embodiments, computer system 1000 may be used to implement any of the various servers and computer systems described above. As shown in FIG. 10, computer system 1000 includes various subsystems including a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors (GPUs), digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above for performing transaction-signed one-time password authentication operations.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method, comprising:
receiving, by an access manager system implemented using at least one hardware processor, an authentication request from an application system, the authentication request being for a transaction that a user has requested the application system to perform, wherein the authentication request includes information identifying an attribute of the transaction and a value received by the application system for the attribute of the transaction, wherein the attribute of the transaction and the value received by the application system for the attribute of the transaction are selected from a set of data for the transaction, the set of data comprising one or more attributes and one or more associated values;
transmitting, by the access manager system, to a client device associated with the user, attribute information identifying the attribute of the transaction;
receiving, by the access manager system, from the client device, a first one-time password (OTP), wherein the first OTP is generated by the client device using a value provided at the client device and a first token, and wherein the first token is generated by the client device using a token generation technique;
generating, by the access manager system, a second token using the token generation technique;
generating, by the access manager system, a second OTP, wherein the second OTP is generated by the access manager system using the second token and the value included in the authentication request;
comparing the first OTP to the second OTP;
based on the comparing, determining, by the access manager system, that the first OTP matches the second OTP, wherein the matching of the first OTP and the second OTP indicates that the value provided at the client device matches the value included in the authentication request; and
based on determining that the first OTP matches the second OTP, transmitting, by the access manager system to the application system, an authentication result indicating that the user is successfully authenticated for the transaction.

2. The method of claim 1, further comprising:
receiving, by the access manager system, a third OTP, wherein the third OTP is generated based upon a third token and a first value for a second transaction that a second user has requested the application system to perform;
generating, by the access manager system, a fourth token according to the token generation technique;
generating, by the access manager system, a fourth OTP using the fourth token and a second value for the second transaction; and
determining, by the access manager system, that the third OTP does not match the fourth OTP.

3. The method of claim 2, further comprising:
responsive to determining that the third OTP does not match the fourth OTP, transmitting, by the access manager system, a message causing a second client device of the second user to prompt the second user to attempt to authenticate again.

4. The method of claim 2, further comprising:
responsive to the determining that the third OTP does not match the fourth OTP, transmitting, by the access manager system, a message to the application system indicating that the third OTP does not match the fourth OTP.

5. The method of claim 1, wherein the value is received by the application system via a gateway communicatively coupled between the client device and the application system.

6. The method of claim 5, wherein the value is transmitted by the application system within a header field of a HyperText Transfer Protocol (HTTP) response message.

7. The method of claim 5, wherein the authentication result indicates that the first OTP matches the second OTP, and wherein the authentication result is transmitted to the application system via the gateway.

8. The method of claim 1, wherein the attribute information is transmitted within a Short Message Service (SMS) message.

9. A non-transitory computer-readable storage medium storing instructions which, when executed by one or more hardware processors of an access manager system, cause the one or more hardware processors to:
- receive an authentication request from an application system, the authentication request being for a transaction that a user has requested the application system to perform, wherein the authentication request includes information identifying an attribute of the transaction and a value received by the application system for the attribute of the transaction, wherein the attribute of the transaction and the value received by the application system for the attribute of the transaction are selected from a set of data for the transaction, the set of data comprising one or more attributes and one or more associated values;
- transmit, to a client device associated with the user, attribute information identifying the attribute of the transaction;
- receive, from the client device, a first one-time password (OTP), wherein the first OTP is generated by the client device using a value provided at the client device and a first token, and wherein the first token is generated by the client device using a token generation technique;
- generate a second token using the token generation technique;
- generate a second OTP, wherein the second OTP is generated using the second token and the value included in the authentication request;
- compare the first OTP to the second OTP;
- based on the comparing, determine that the first OTP matches the second OTP, wherein the matching of the first OTP and the second OTP indicates that the value provided at the client device matches the value included in the authentication request; and
- based on determining that the first OTP matches the second OTP, transmit an authentication result to the application system, the authentication result indicating that the user is successfully authenticated for the transaction.

10. The non-transitory computer-readable storage medium of claim 9, wherein the instructions further cause the one or more hardware processors to:
- receive a third OTP, wherein the third OTP is generated based upon a third token and a first value for a second transaction that a second user has requested the application system to perform;
- generate a fourth token according to the token generation technique;
- generate a fourth OTP using the fourth token and a second value for the second transaction; and
- determine that the third OTP does not match the fourth OTP.

11. The non-transitory computer-readable storage medium of claim 10, wherein the instructions further cause the one or more hardware processors to:
- responsive to determining that the third OTP does not match the fourth OTP, transmit a message causing a second client device of the second user to prompt the second user to attempt to authenticate again.

12. The non-transitory computer-readable storage medium of claim 10, wherein the instructions further cause the one or more hardware processors to:
- responsive to the determining that the third OTP does not match the fourth OTP, transmit a message to the application system indicating that the third OTP does not match the fourth OTP.

13. The non-transitory computer-readable storage medium of claim 9, wherein the value is received by the application system via a gateway communicatively coupled between the client device and the application system; and
- wherein the value is transmitted by the application system within a header field of a HyperText Transfer Protocol (HTTP) response message.

14. The non-transitory computer-readable storage medium of claim 13, wherein the authentication result indicates that the first OTP matches the second OTP, and wherein the authentication result is transmitted to the application system via the gateway.

15. The non-transitory computer-readable storage medium of claim 9, wherein the attribute information is transmitted within a Short Message Service (SMS) message.

16. An access manager server, comprising:
- one or more hardware processors; and
- a non-transitory computer-readable storage medium storing instructions which, when executed by the one or more hardware processors, cause the one or more hardware processors to:
  - receive, from an application system, an authentication request for a transaction that a user has requested the application system to perform, wherein the authentication request includes information identifying an attribute of the transaction and a value received by the application system for the attribute of the transaction, wherein the attribute of the transaction and the value received by the application system for the attribute of the transaction are selected from a set of data for the transaction, the set of data comprising one or more attributes and one or more associated values;
  - transmit, to a client device associated with the user, attribute information identifying the attribute of the transaction;
  - receive, from the client device, a first one-time password (OTP), wherein the first OTP is generated by the client device using a value provided at the client device and a first token, and wherein the first token is generated by the client device using a token generation technique;
  - generate a second token using the token generation technique;
  - generate, a second OTP, wherein the second OTP is generated using the second token and the value included in the authentication request;

compare the first OTP to the second OTP;
  based on the comparing, determine that the first OTP matches the second OTP, wherein the matching of the first OTP and the second OTP indicates that the value provided at the client device matches the value included in the authentication request; and
  based on determining that the first OTP matches the second OTP, transmit, to the application system, an authentication result indicating that the user is successfully authenticated for the transaction.

17. The access manager server of claim 16, wherein the instructions further cause the one or more hardware processors to:
  receive a third OTP, wherein the third OTP is generated based upon a third token and a first value for a second transaction that a second user has requested the application system to perform;
  generate a fourth token according to the token generation technique;
  generate a fourth OTP using the fourth token and a second value for the second transaction; and
  determine that the third OTP does not match the fourth OTP.

18. The access manager server of claim 17, wherein the instructions further cause the one or more hardware processors to:
  transmit a message to the application system indicating that the third OTP does not match the fourth OTP.

19. The access manager server of claim 16, wherein the value is received by the application system via a gateway communicatively coupled between the client device and the application system.

20. The access manager server of claim 19, wherein the authentication result indicates that the first OTP matches the second OTP, wherein the authentication result is transmitted to the application system via the gateway; and wherein at least one of the first token and the attribute is transmitted within a Short Message Service (SMS) message.

21. The method of claim 1, wherein the authentication result further indicates that the application system is allowed to perform the transaction that the user has requested the application system to perform.

22. The method of claim 1, wherein the first OTP is generated by modifying the first token using the value provided at the client device.

* * * * *

UNITED STATES PATENT AND TRADEMARK OFFICE
CERTIFICATE OF CORRECTION

PATENT NO. : 10,250,594 B2
APPLICATION NO. : 14/671935
DATED : April 2, 2019
INVENTOR(S) : Chathoth et al.

Page 1 of 1

It is certified that error appears in the above-identified patent and that said Letters Patent is hereby corrected as shown below:

In the Specification

In Column 17, Line 26, delete "740," and insert -- 705, --, therefor.

In Column 17, Line 26, delete "an a" and insert -- a --, therefor.

Signed and Sealed this
Third Day of November, 2020

Andrei Iancu
*Director of the United States Patent and Trademark Office*